(12) United States Patent
Fitzgerald

(10) Patent No.: US 7,405,670 B2
(45) Date of Patent: Jul. 29, 2008

(54) METHOD AND SYSTEM FOR DETECTING AND ISOLATING STRAY VOLTAGE

(76) Inventor: Timothy W. Fitzgerald, 233 Birch St., Winneconne, WI (US) 54986

( * ) Notice: Subject to any disclaimer, the term of this patent is extended or adjusted under 35 U.S.C. 154(b) by 243 days.

(21) Appl. No.: 11/193,206

(22) Filed: Jul. 29, 2005

(65) Prior Publication Data

US 2007/0024452 A1    Feb. 1, 2007

(51) Int. Cl.
G08B 21/00 (2006.01)
(52) U.S. Cl. .......................... 340/606; 340/618; 222/61
(58) Field of Classification Search ............... 340/603, 340/604, 605, 606, 612, 618, 623, 624, 626, 340/573.1, 573.3; 60/484, 470; 222/61
See application file for complete search history.

(56) References Cited

U.S. PATENT DOCUMENTS

| | | | | |
|---|---|---|---|---|
| 4,019,528 A | * | 4/1977 | Tyrrell | 137/209 |
| 4,284,210 A | * | 8/1981 | Horak | 222/14 |
| 4,367,414 A | | 1/1983 | Miller et al. | |
| 4,396,844 A | | 8/1983 | Miller et al. | |
| 4,401,055 A | | 8/1983 | Street et al. | |
| 4,484,258 A | | 11/1984 | Miller et al. | |
| 4,489,385 A | | 12/1984 | Miller et al. | |
| 4,511,895 A | | 4/1985 | Miller et al. | |
| 4,535,332 A | | 8/1985 | Miller et al. | |
| 4,598,286 A | | 7/1986 | Miller et al. | |
| 4,735,049 A | * | 4/1988 | Ketonen | 60/484 |
| 4,816,956 A | | 3/1989 | Hertz et al. | |
| 4,958,250 A | | 9/1990 | Kotski | |
| 5,294,023 A | * | 3/1994 | Ioannides et al. | 222/61 |
| 5,640,314 A | | 6/1997 | Glasband et al. | |
| 5,793,591 A | | 8/1998 | Summerer et al. | |
| 5,798,916 A | | 8/1998 | Stacey et al. | |
| 5,825,170 A | | 10/1998 | Montreuil | |
| 6,396,137 B1 | | 5/2002 | Klughart | |
| 6,469,636 B1 | | 10/2002 | Baird et al. | |
| 6,690,565 B2 | | 2/2004 | Montreuil | |

(Continued)

OTHER PUBLICATIONS

Reines, Richard S. and Cook, Mark A., "PSC Staff Report: The Phase II Stray Voltage Testing Protocol," Rural Electric Power Services, Public Service Commission of Wisconsin, Feb. 1999, 23 pages.

(Continued)

Primary Examiner—Van T. Trieu
(74) Attorney, Agent, or Firm—Michael Best & Friedrich LLP

(57) ABSTRACT

A stray voltage detection and reduction system. The stray voltage detection portion of the system includes a vessel configured to hold a liquid, such as water. An electrode is suspended in the water, and another electrode is positioned below the vessel in contact with the earth. A meter is coupled to the electrodes in such a manner that when an animal drinks from the vessel the presence or absence of stray voltage is detected by the meter. The stray voltage reduction portion of the system electrically isolates a water distribution system. A water source is connected to non-electrically-activated valves. The valves feed a plurality of storage tanks. The storage tanks connect to non-electrically-activated valves which are coupled to a booster pump. A control system ensures that the water source remains electrically-isolated from the booster pump.

41 Claims, 13 Drawing Sheets

U.S. PATENT DOCUMENTS

2002/0122286 A1    9/2002    Anthony

OTHER PUBLICATIONS http://www.bassengineering.com/SV_Utility_.htm, "Stray Voltage Caused by the Electrical Utility," Jan. 7, 2001, pp. 1-3, Bass Associates Inc.

Dahlberg, Duane A., Ph.D., "Ground Currents, an Important Factor in Electromagnetic Exposure," http://www.sncmfg.com/telecom/stray_voltage/dahlberg.html, The Stray Voltage Mitigators, prepared in 1995 and revised Mar. 1999, pp. 1-9, SNC Manufacturing Co., Inc.

Reinemann, Douglas J., Ph.D., Stetson, LaVerne E., Dasho, Daniel M., and Cook, Mark A., "Stray Voltage Update 97," Conference Paper presented at the 1997 Rural Electric Power Conference, Apr. 20-22, 1997, pp. 1-11, sponsored by the Institute of Electrical and Electronics Engineers, Inc., Minneapolis, MN.

"Neutral-to-Ground Voltage Shock Incidents," pp. 1-9, revised May 6, 1993.

http://www.wisconsinpublicservice.com/farm/measuring.asp, "Measuring Stray Voltage on the Farm," pp. 1-2, Wisconsin Public Service Corporation, webpage accessed on Aug. 28, 2006.

"Stray Voltage Detection," A Self-Help Guide, Wisconsin Farm Electric Council, pp. 2-11, Feb. 1997.

Hardie, Chris, "Researchers demonstrate stray voltage measurement techniques," StrayVoltage.org, Special Reports Archive, http://www.strayvoltage.org/stories/index.php3?Story=20010812_researchers.inc, pp. 1-3, Aug. 12, 2001, webpage accessed on August 28, 2006.

"Stray Voltage on Dairy Farms," EEI Transmission & Distribution Conference, Vern Peterson P.E., Minneapolis, MN, Oct. 13, 2004.

La Duca, Sal, "Stray Voltage from Stray Currents," http://www.emfrelief.com/stray.htm, Environmental Assay Inc., copyright 2005, webpage accessed on Mar. 13, 2006.

\* cited by examiner

METHOD AND SYSTEM FOR DETECTING AND ISOLATING STRAY VOLTAGE

BACKGROUND

Stray voltage is a difference in electrical potential or a voltage that exists outside of an electrical delivery system. One form of stray voltage is neutral-to-earth ("NE") voltage. NE voltage is an electrical potential or voltage between the neutral of an electrical delivery system and an earth ground. NE voltages may be created as a consequence of the architecture of an electric power distribution system. In general, electric power is distributed from a generation site to a number of substations. In one relatively common distribution path, high voltage electricity from a substation is delivered to a line transformer located at a facility that consumes electricity, such as a home, business, or farm. As the distance from the line transformer to the substation increases, an electrical potential between the primary neutral of the line transformer and earth ground increases. The National Electrical Safety Code ("NESC") specifies that utilities connect the neutral on the primary side of a facility's step down transformer to the neutral on the secondary side of the transformer. The purpose of this is to prevent excessively dangerous voltage levels in the event of an open circuit on the primary neutral. However, this recommended connection can cause a situation where the difference in potential of the primary neutral to earth ground is passed to the secondary neutral. The difference in potential can reach a relatively significant level, such as twenty volts.

Another form of stray voltage is an electrical potential that exists between two points susceptible to contact simultaneously by an animal. For example, some electrical distribution systems are designed to utilize the earth as a return path for current to the substation. More specifically, the earth is used as a current return in parallel to the primary neutral. Differences in the impedance of soils may result in differences in electrical potential between two points of earth ground or the earth ground and the electrical system neutral. Thus, it is possible that an animal may simultaneously contact points that have different potentials resulting in current traveling through the animal's body.

SUMMARY

Stray voltages can have numerous effects including, as noted, causing current to travel through an animal. Although relatively high voltages can cause shocks, stray voltages generally do not reach the level of an electrical shock. Nonetheless, such currents can cause discomfort. For example, it is possible for a stray current to travel through a floor of a livestock barn through the body of an animal to reach the metal structure of the barn, and its grounding connection network.

Although stray currents may travel through the structure of a building, the inventor has also learned that stray voltage may cause electricity to flow through the plumbing of a water delivery system. The National Electrical Code ("NEC") requires that, when wiring a farm, the secondary neutral of the line transformer mentioned above be hard wired to the buildings, the water system, and an electrical ground rod. In addition, NEC and NESC require that all wells be grounded and that secondary neutrals be connected to a building's water system. However, in many areas a certain amount of current will flow to water wells from the primary neutral. Areas that are susceptible to this kind of current include areas where maintenance of power lines is poor, the distance from the utility substation is large, or the conductivity of the soil is poor. In addition, areas that have experienced growth in electrical load and development of wells are also susceptible.

Therefore, a water delivery system, that is not electrically isolated from points in the system connected to the secondary neutral, has the ability to cause current to flow through animals that contact earth ground and the water system.

Stray current can cause a variety of effects in animals. For example, the discomfort experienced by an animal may cause it to avoid the area of a building where the current is experienced. If a stray current is caused when drinking from a water delivery system, an animal may avoid drinking or drink less. The effects can vary with the particular species of animal experiencing the stray current. For example, cows are sensitive to very low voltage levels, as low as 0.5 volt. In the presence of stray current, various observations have been made. Some cows refuse to be milked, refuse to enter a barn, or kick a milker. In some situations, it may be possible for a cow to experience mastitis, reproductive problems, and problems associated with somatic cell count.

Similar problems have also been encountered in pigs. In addition, it is believed that stray currents have caused diarrhea, constipation, and an increase in piglet mortality.

Therefore, there exists a need to reduce the presence of stray voltage on a farm or other facility in which animals are confined, such as a feedlot. Embodiments of the invention isolate a water delivery system from a secondary neutral reducing the possibility of the water delivery system introducing stray voltage into the farm.

One embodiment provides a system to detect stray voltage. The system includes a non-conductive vessel having a rim and an interior. The vessel may hold a liquid such as water. A first electrode is suspended in the interior of the vessel below the rim. A second electrode is configured to be placed in contact with a ground potential. The system also includes one or more meters that are configured to sense one or more electrical characteristics, such as a voltage or a current. The first electrode, second electrode, and meter are connected in a manner such that if an animal contacts the ground potential and drinks a liquid from the vessel, a closed electrical circuit including the first electrode, second electrode, and the meter is formed Another embodiment provides a method of detecting stray voltage at a facility. The method includes positioning a non-conductive vessel having a rim and an interior and configured to hold a liquid on a surface; positioning a first electrode in the interior below the rim; positioning a second electrode below the non-conductive vessel in contact with a ground potential; providing a meter configured to sense an electrical characteristic; and connecting the first electrode, second electrode, and meter such that if an animal contacts the ground potential and drinks a liquid from the vessel, an electrical circuit including the first electrode, second electrode, and meter exists.

Another embodiment provides an electrically isolating liquid (e.g., water) distribution system. The system includes a first valve and a first tank that is fed by the first valve. A second valve which is made from non-conductive materials is also connected to the first tank. A second tank is fed by the second valve. A third valve constructed of non-conductive materials and non-electrically-actuated is also connected to the second tank. A controller communicates with the valves and controls them to prevent the second valve and the third non-electrically-actuated valve from opening simultaneously. The system also includes a connection, port, or output that may be coupled to a liquid container such as a water trough.

Another embodiment provides a method for reducing stray voltage in a liquid delivery system. The method includes providing a first storage tank; providing a second storage tank; monitoring the first storage tank; monitoring the second storage tank; filling the first storage tank when a liquid reaches a low level; filling the second storage tank when a liquid reaches a low level; delivering the liquid from the first or second storage tank to a liquid delivery device; controlling filling of the first storage tank and delivery from the first storage tank such that only one of the processes can occur at a single time; and controlling filling of the second storage tank and delivery from the second storage tank such that only one of the processes can occur at a single time.

While the embodiments of the invention described herein relate to animal containment facilities, embodiments could be used in other locations or facilities where there is a desire to electrically isolate a liquid delivery system from its source. Such applications may include hospital water delivery systems, paint spraying systems, swimming pools, water parks, machining systems, semiconductor manufacturing, fiberglass manufacturing, and others.

Additional details and additional features and aspects of embodiments of the invention are described below.

DETAILED DESCRIPTION

Figure 1:
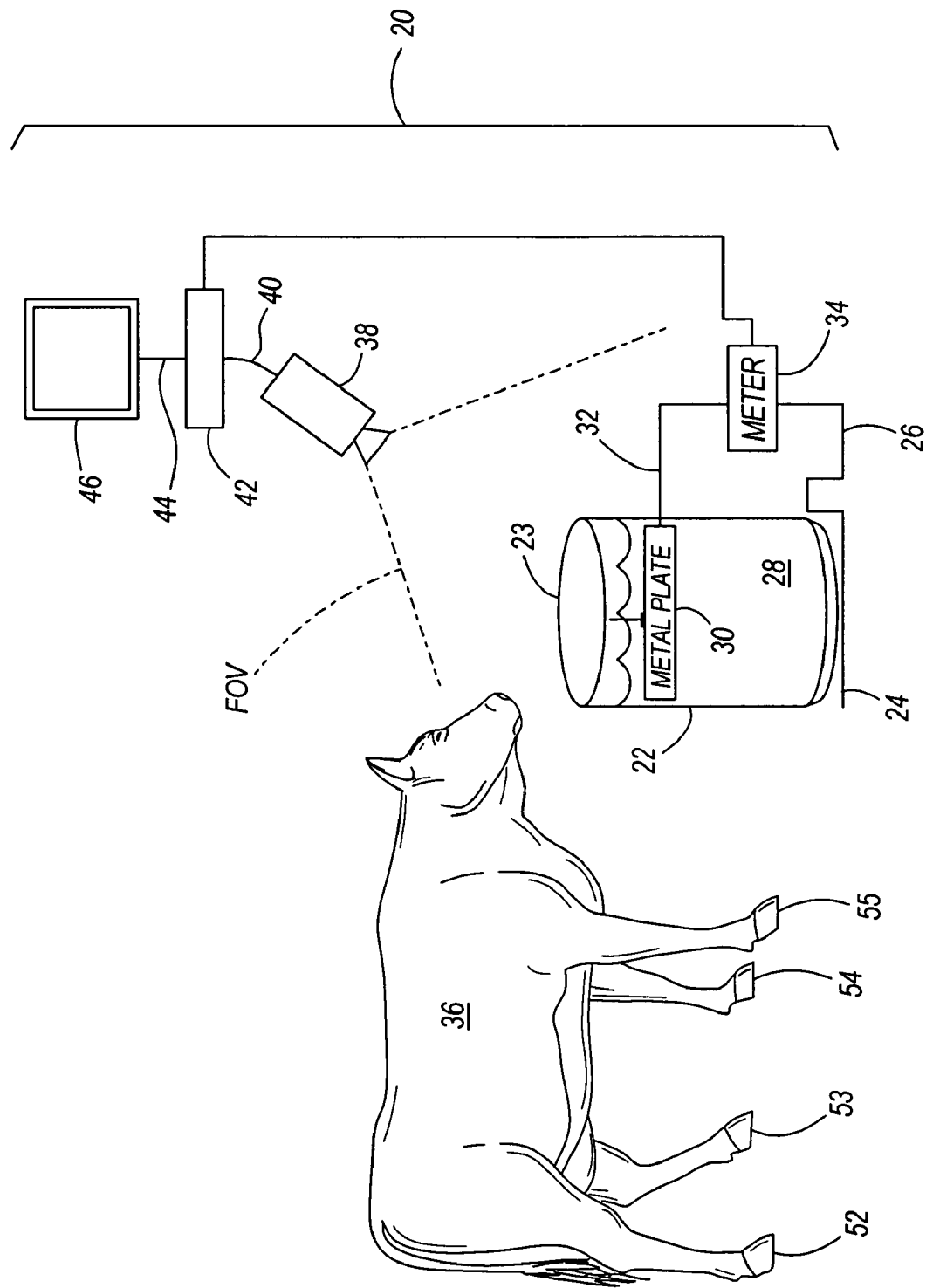
FIG. 1 is an exemplary illustration of a detection device to determine if stray voltage is present in a facility.

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

FIG. 1 shows an embodiment of a detection device 20 to determine if stray voltage is present in a facility. In the embodiment shown, a 25 gallon non-conductive vessel or bucket 22, having a rim 23, sits on a nongalvanic conductive plate 24 (e.g., a one foot square copper plate). The conductive plate 24 has a 14 American wire gauge ("awg") conductive lead 26 attached to it. The bucket is filled with water 28 and a second plate 30 (such as a copper plate or electrode) is suspended below the top surface of the water 28. The second plate 30 may be fixed to a float or other mechanism to maintain the plate 30 a predetermined distance below the surface of the water 28, such as 6". A 14 awg conductive lead 32 is attached to the plate 30. An electrical measuring device or meter 34, such as a direct current ("DC") milliameter, a voltmeter, or an alternating current ("AC") meter, is attached between the two leads 26 and 32 to measure an electrical characteristic, such as current. When an animal 36 drinks from bucket 22, meter 34 measures a chosen electrical characteristic (e.g., current or voltage).

A camera 38 captures an image or images in a field of view ("FOV") that may encompass the bucket 22 and animal 36 and transmits that image via cable 40 to a recording device 42 (e.g., a video cassette recorder). The recording device 42 records the images transmitted by the camera 38. The recording device 42 may deliver the images received from camera 38 via a cable 44 to a display device 46 (e.g., a television) or play back an image previously saved, transmitting a signal of the saved images to the display device 46.

Information from the meter 34 and the camera 38 can be used to determine the presence of stray voltage and the stray current or currents such voltage causes. For example, if a stray voltage is present, animals may avoid drinking from the bucket 22. In addition, the animals may exhibit other signs of discomfort, such as retracting their heads, when first contacting the water in bucket 22. This behavior is captured by the camera 38. Meter 34 may also be placed in the FOV and an image from the meter can be captured by the camera 38. When the meter indicates the presence of a stray voltage or current and discomfort or other behavior is observed in the images recorded by the camera and these phenomena happen at the same time, it can be assumed that an undesirable stray voltage situation exists. Of course, the presence of just one of these phenomena may be sufficient to determine that a stray voltage situation exists.

Other embodiments allow for meter 34 to be coupled directly to recording device 42. Readings from meter 34 could be indicated on, and correlated to, images of the animal's reactions captured by the camera 38.

In still other embodiments, multiple cameras 38 can be configured such that the FOV of each camera 38 captures images of different components of the system (e.g., the meter 34 and the cow 36). The signals from the cameras 38 can then be multiplexed together and simultaneously recorded and/or viewed.

Figure 2:
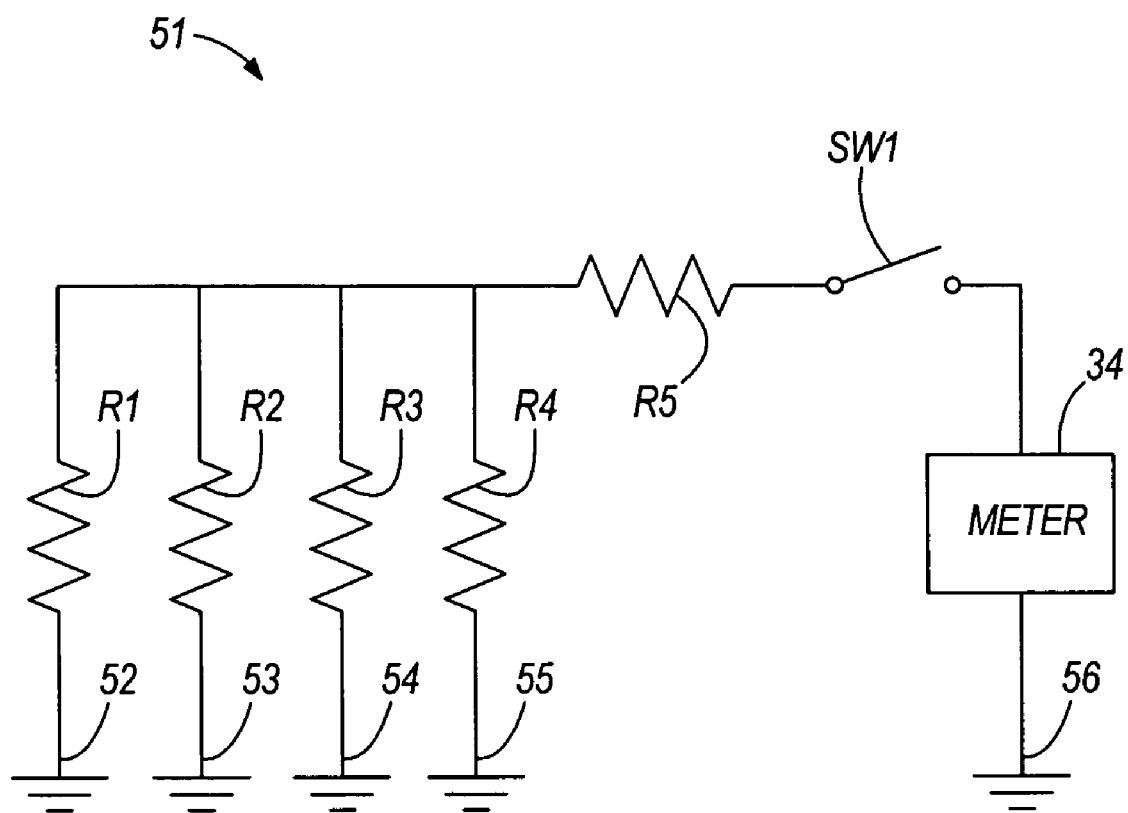
FIG. 2 illustrates a circuit that may be formed by the detection device of FIG. 1.

FIG. 2 illustrates a circuit 51 created by an animal 36 drinking from bucket 22. Resistors 1-4 represent legs of the animal 36. Each leg presents some impedance to electrical current and is represented as a resistor. The animal 36 stands on the ground with all four feet or hooves contacting the ground. Therefore, each resistor, R1-R4, is connected to earth ground. R5 represents the impedance to electrical current supplied by the body of the animal 36. R1-R4, R5, and meter 34 are part of a circuit 51. A switch (SW1) represents the break in the circuit 51 that exists when the animal 36 is not drinking from the bucket 22. When the animal 36 drinks from bucket 22, the circuit 51 is completed, which is represented by closure of the switch (SW1). In the absence of stray voltage, the electrical potential of grounds 52-56 are all the same and no electrical current flows through the circuit 51.

Figure 3A:
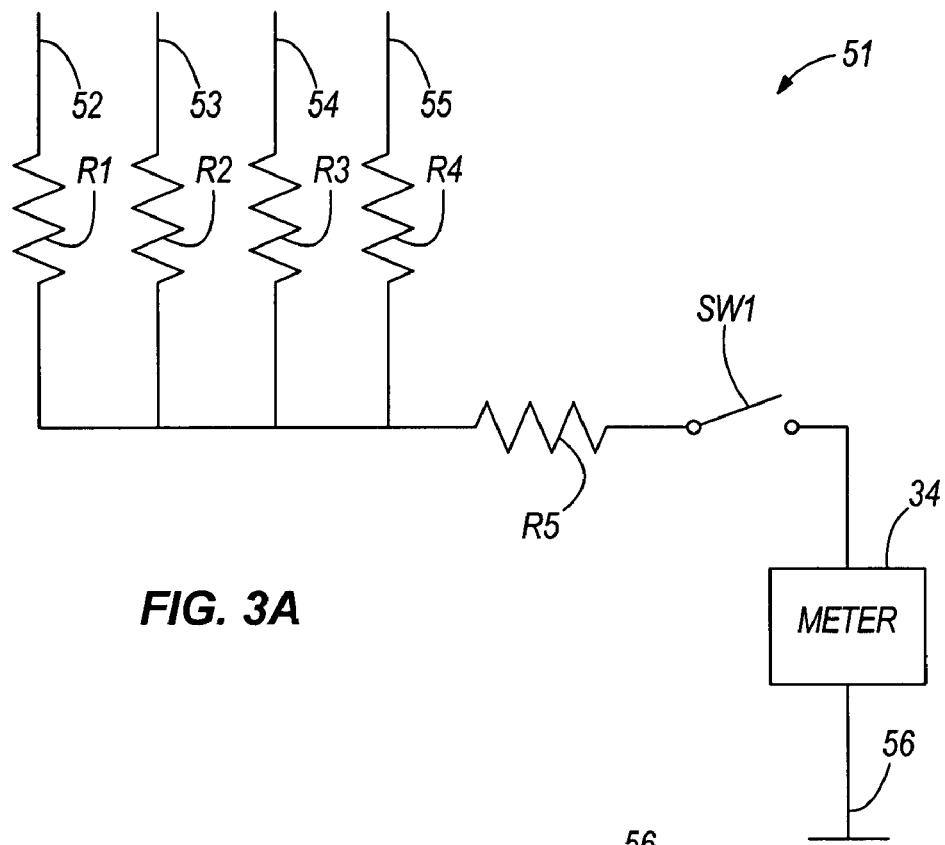
FIG. 3A illustrates another circuit that may be formed by the detection device of FIG. 1.
Figure 3B:
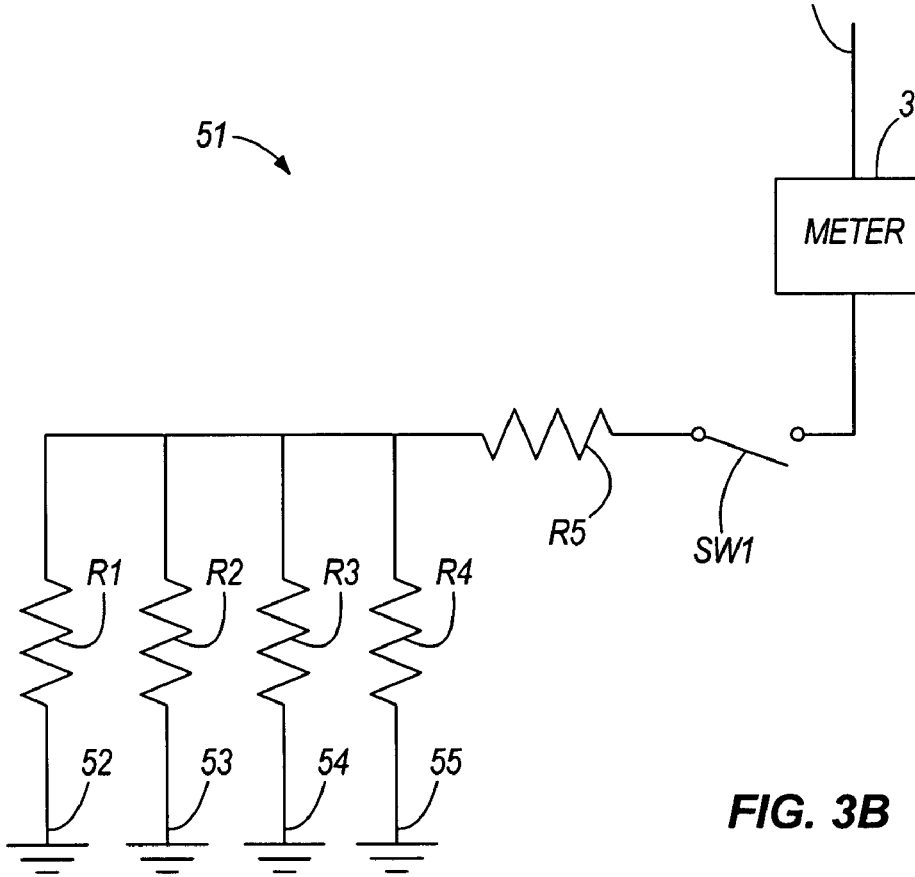
FIG. 3B illustrates another circuit that may be formed by the detection device of FIG. 1.

However, in the presence of stray voltage, an electrical potential between two or more of the earth grounds 52-56 may exist. FIGS. 3A and 3B represent two possible embodiments of stray voltage. In FIG. 3A, animal 36 is in contact with grounds 52-55 that are at a higher electrical potential than ground 56 under bucket 22. When the animal 36 drinks from bucket 22 (which in the model is represented as closing switch SW1), the electrical potential enables electrical current to flow from grounds 52-55 through the animal 36 to ground 55.

In FIG. 3B, animal 36 is in contact with grounds 52-55 that are at a lower electrical potential than ground 56 under bucket 22. When animal 36 drinks from bucket 22, the electrical potential enables electrical current to flow from ground 56 through the animal 36 to grounds 52-55.

Figure 4:
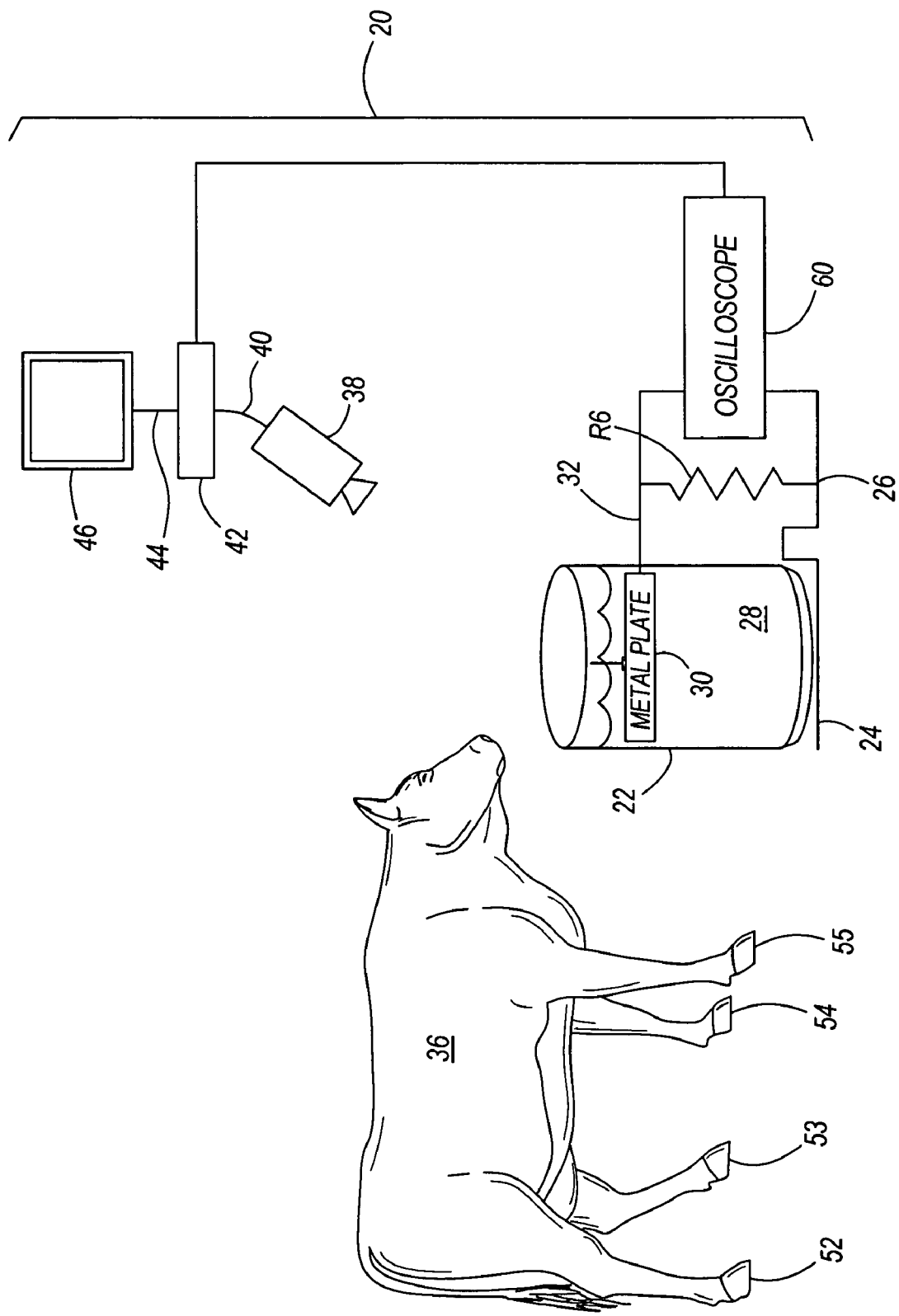
FIG. 4 is an exemplary illustration of a detection device to determine if a time varying stray voltage is present in a facility.

In another embodiment, shown in FIG. 4, detection device 20 determines the presence of stray AC electricity. An optional resistor (R6) may be connected between lead 26 and lead 32. An oscilloscope 60 monitors the voltage across leads 26 and 32. When animal 36 is not drinking from the bucket, an open circuit condition exists. When animal 36 drinks from bucket 22, a closed circuit condition exists. If an electrical potential exists between earth ground 56 and one or more of the four grounds 52-55 under the hooves of animal 36, as illustrated in FIGS. 3A and 3B, the oscilloscope displays a waveform that represents a portion of the potential. If the electrical potential has an AC or time-varying component, the oscilloscope displays a sine wave of a magnitude indicative of the magnitude of the AC component of the electrical potential. A cow is generally accepted to have a total impedance of approximately 200Ω. Therefore, if animal 36 is a cow, the magnitude of the signal displayed on the oscilloscope will be approximately 70% of the actual electrical potential.

Figure 5A:
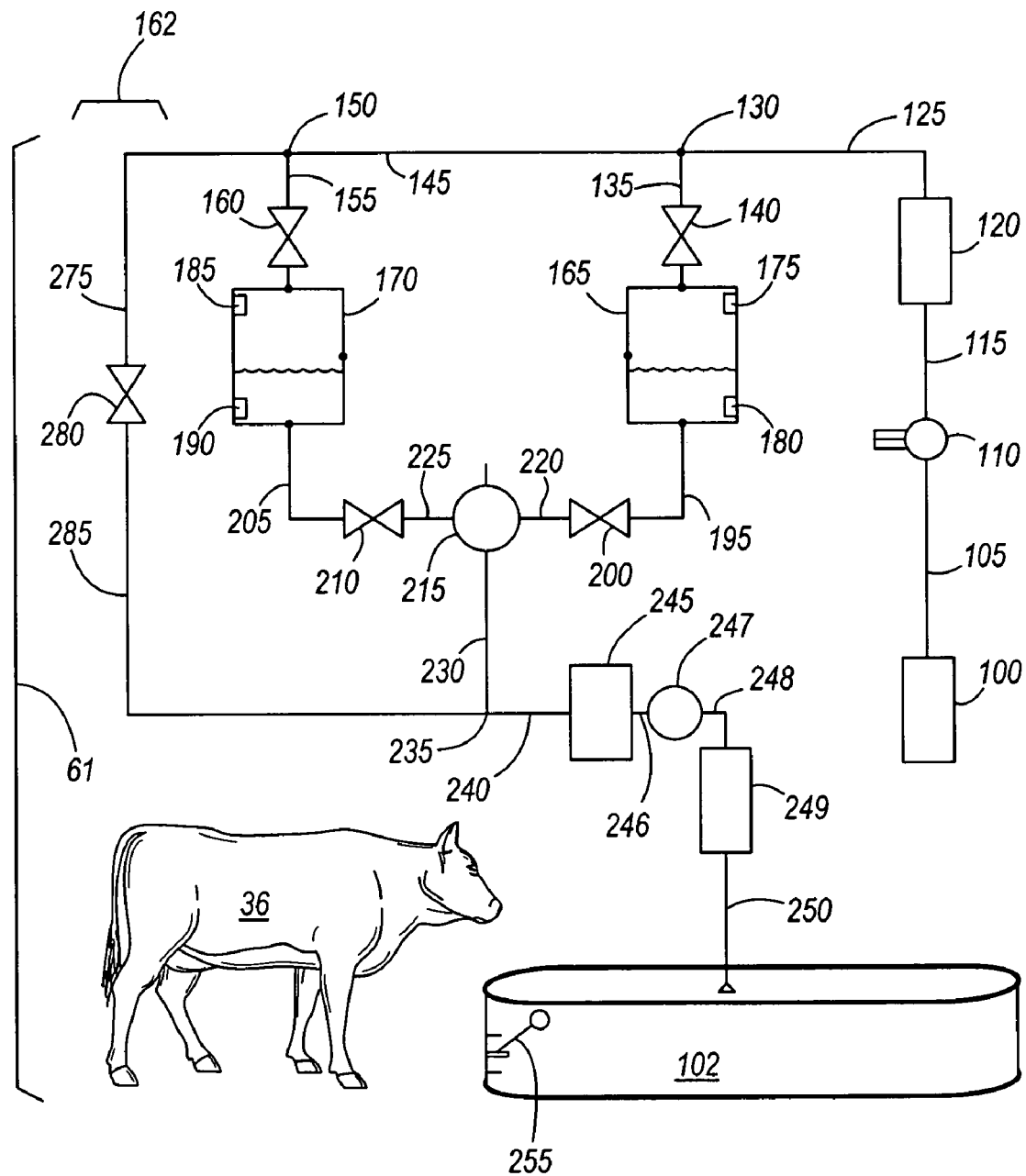
FIG. 5A is an exemplary illustration of a first embodiment of a water delivery system to reduce stray voltage.

FIG. 5A illustrates a water system 61 that is configured to reduce stray voltage affects on animals that drink from it. The system 61 could be implemented, for example, after testing a farm or other facility with the system 20 for the presence of stray voltage or current. The system 61 is configured such that a well 100 is electrically isolated from a portion of water delivery system that animals can contact such as a water trough 102. Of course, the water could be delivered to a number of troughs or different delivery devices, such as sinks, tubs, and other plumbing fixtures. All electrical conductors (which include any conductive pipes, tanks, etc., that are included in the water delivery system 61) between the grounded well 100, and a secondary neutral of the electrical distribution system (not shown), are electrically isolated from the water trough 102.

The delivery containment devices and the water being supplied from a well 100 are electrically isolated in the system 61. The system 61 includes one or more wells (referred to as well 100) and its associated devices, such as a pump and power supply for the pump (not shown). Well 100 delivers water through pipe 105 which is connected to a pressure switch 110. When pressure above a predetermined threshold is detected by pressure switch 110, the pressure switch 110 opens an internal switch removing power to the pump of well 100.

Water exits the pressure switch 110 through pipe 115 and enters filter 120. The filter removes certain contaminants such as sediment contained in the water. Water then flows through pipe 125 into a Y-fitting or similar device 130 that divides the water into two paths. The first path flows through pipe 135 and into a first valve 140. The second path can flow through pipe 145. An optional Y-fitting or similar device 150 may connected to the pipe 145 to again divide the water into two paths. The first path flows into a pipe 155 which feeds a second valve 160. The second path flows into an optional, manual bypass system 162. If desired, the bypass system 162 provides a mechanism to ensure the flow of water to the trough 102 in the event of a failure in other parts of the system 61.

When the first valve 140 is opened, water flows into a first storage tank 165. When the second valve 160 is opened, water flows into a second storage tank 170. When the first valve 140 is closed, an air gap exists between the water from the well 100 and water in the first storage tank 165. This air gap acts as an electrical isolator isolating the water in the first storage tank 165 from the well 100. When the second valve 160 is closed, an air gap exists between the water from the well 100 and water in the second storage tank 170. This air gap also acts as an electrical isolator isolating the water in the second storage tank 170 from the well 100.

A first sensor 175 detects when the water has reached a high level in the first storage tank 165. A second sensor 180 detects when the water has reached a low level in the first storage tank 165. A third sensor 185 detects when the water has reached a high level in the second storage tank 170. A fourth sensor 190 detects when the water has reached a low level in the second storage tank 170. Water flows out of the first storage tank 165 via pipe 195 and into a third valve 200. The third valve 200 is constructed from non-conductive materials and is actuated non-electrically (e.g., air). Water flows out of the second storage tank 170 via pipe 205 and into a fourth valve 210. The valve 210 is constructed from non-conductive materials and is actuated non-electrically (e.g., air). A booster pump 215 is fed from the third valve 200 via pipe 220 or from the fourth valve 210 via pipe 225.

The third valve 200, because of its construction, provides an electrical open, when it is closed, that electrically isolates water in the booster pump 215 from water in the first storage tank 165. This provides electrical isolation between the booster pump 215 and the well 100 when the first storage tank 165 is filling and no air gap exists to isolate the first storage tank 165 from the well 100. Similarly, the fourth valve 210, because of its construction, provides an electrical open, when it is closed, that electrically isolates water in the booster pump 215 from water in the second storage tank 170. This provides electrical isolation between the booster pump 215 and the well 100 when the second storage tank 170 is filling and no air gap exists to isolate the second storage tank 170 from the well 100.

Water flows from the booster pump 215 though pipe 230. Pipe 230 is connected to a Y-fitting or similar device 235 which feeds pipe 240. Pipe 240 is connected to a pressure tank 245 which couples to a pipe 246. Pipe 246 feeds a low voltage pressure switch 247. When pressure above a predetermined threshold is detected by pressure switch 247, the pressure switch 247 opens an internal switch removing power to the booster pump 215. Water exits the pressure switch 247 through pipe 248 and enters filter 249 which filters the water and delivers it to pipe 250. Water flows through pipe 250 to trough 102. A float switch 255 resides in trough 102 to indicate when the water level in trough 102 exceeds a predetermined depth.

Figure 5B:
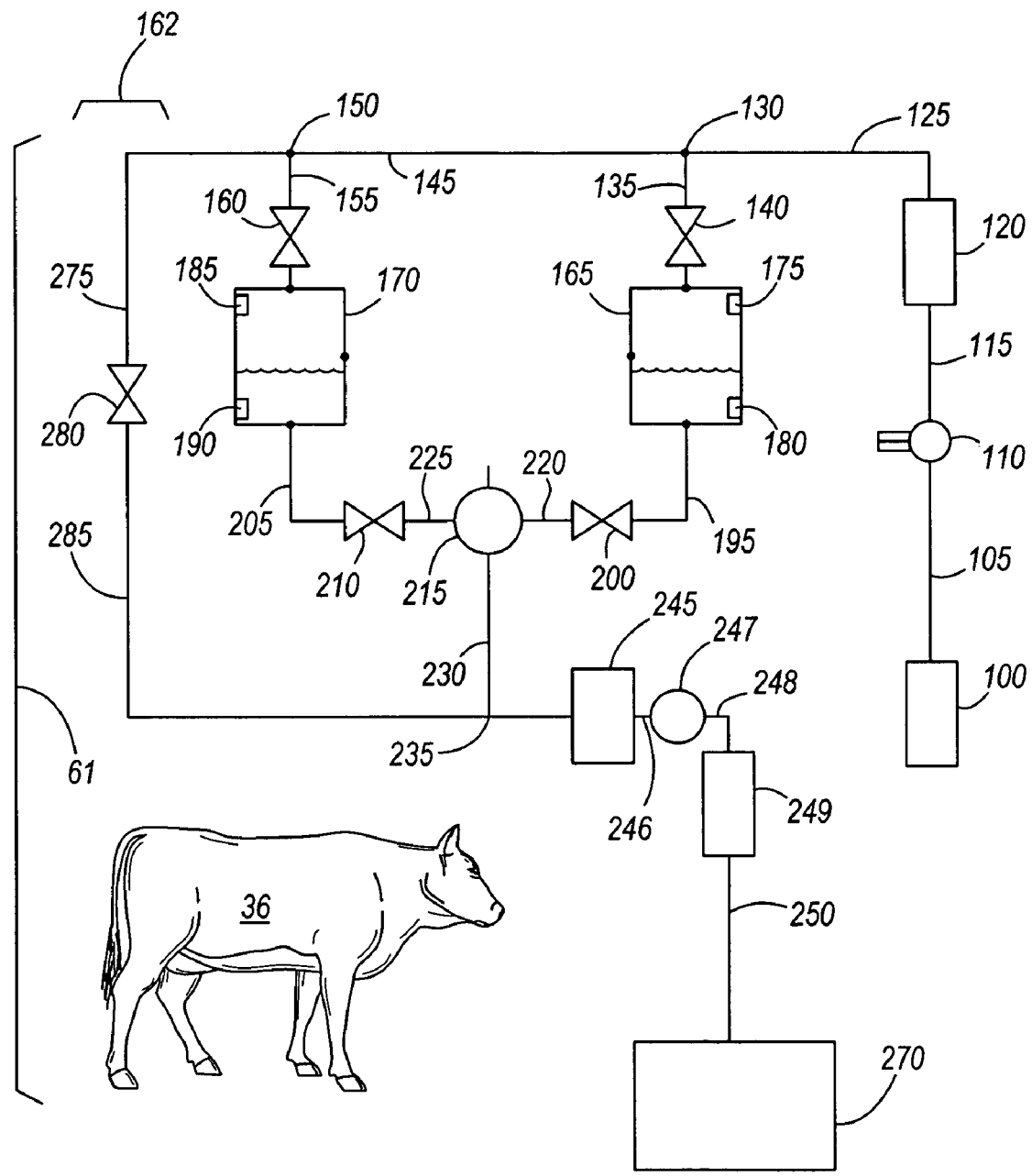
FIG. 5B is an exemplary illustration of a second embodiment of a water delivery system to reduce stray voltage.

An alternative embodiment of the water delivery system 61 is illustrated in FIG. 5B. The system is the same as that shown in FIG. 5A except water flows from pipe 250 into a pressurized delivery system 270. The low voltage pressure switch 247 detects when the water pressure in the pressurized delivery system 270 drops below a pre-determined threshold.

The manual bypass system 162 (FIGS. 5A and 5B) can be configured to supply water to the trough 102 or the pressurized delivery system 270 in the event the water system 61 is unable to do so. A pipe 275 receives water from Y-fitting 150 and is connected to a manually operated valve 280 which is constructed from non-conductive materials. Valve 280 is connected to pipe 285 which delivers water to Y-fitting 235 and the rest of the system. The use of non-conductive materials in valve 280 maintains the electrical isolation of the water system 61 when the valve 280 is closed.

A section of pipe 125 can be constructed of electrically conductive material (e.g., copper). In the presence of stray voltage on the well 100 system, measuring an electrical characteristic (e.g., voltage) between this conductive section of pipe 125 and ground reflects the level of stray voltage present. Additionally, a section of pipe 240 can be constructed of electrically conductive material (e.g., copper). If the system is operating correctly and electrical isolation between well 100 and the output of water system 61 is achieved, measuring an electrical characteristic (e.g., voltage) between this conductive section of pipe 240 and ground will indicate that stray voltage does not exist at this point in the water delivery system 61, even if such a characteristic exists between the conductive section of pipe 125 and ground.

Certain valves used throughout the water distribution system 61 may be non-electrically-actuated to further isolate the water delivery system 61 from the electrical distribution system. For example, pneumatic or air-actuated valves may be used.

In addition, pipes used throughout the water delivery system 61 may be made of non-conductive materials. Materials suitable for use in the pipes include plastics such as polyvinylchloride ("PVC"), ceramics, and other materials.

Figure 6:
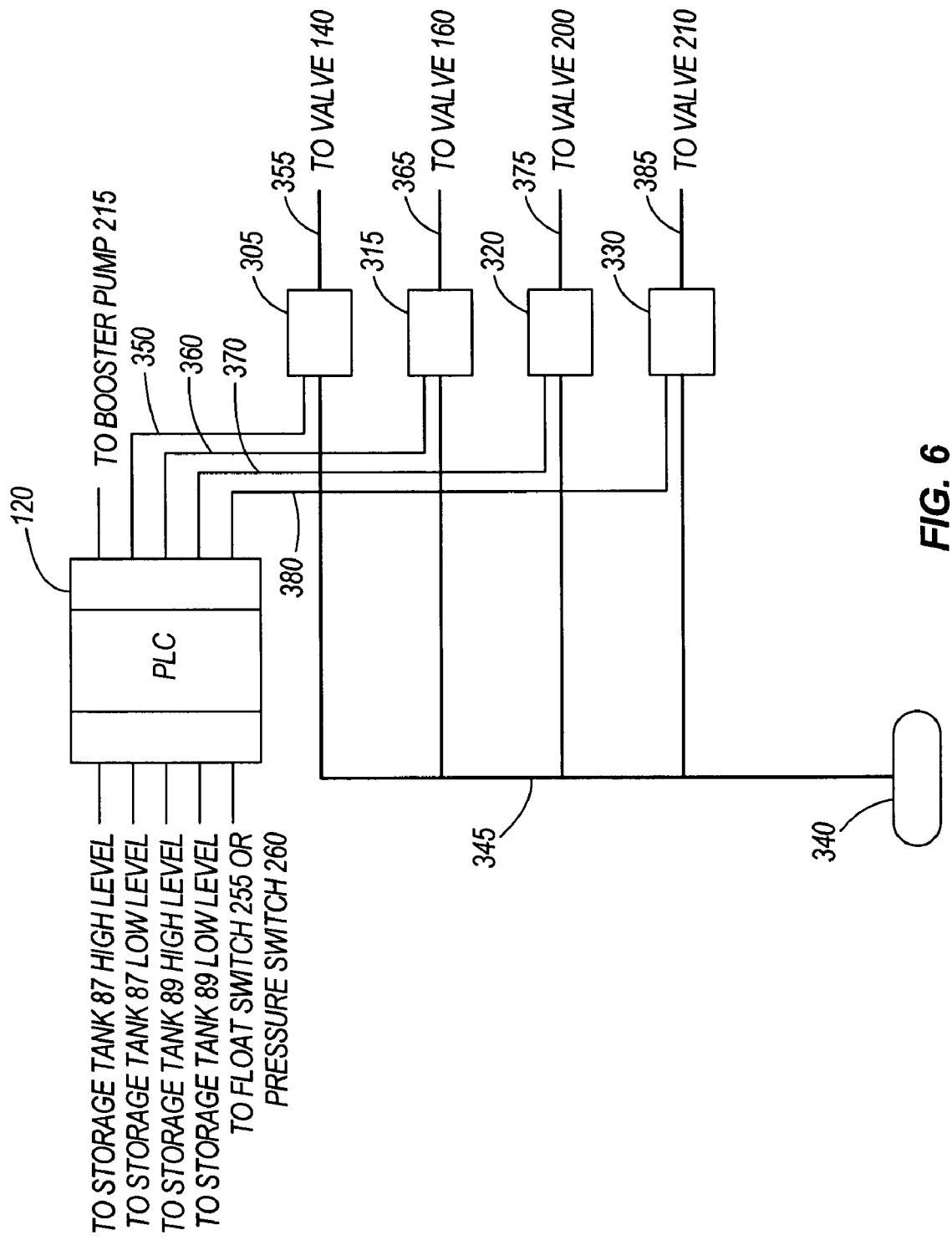
FIG. 6 is an exemplary illustration of a control system for the water delivery system of FIG. 5.

Operation of the water delivery system 61 can be controlled by a programmable logic controller ("PLC") 300 (FIG. 6) such as an Allen-Bradley Micrologix 1200. The PLC 300 receives input signals from the high level indicator 175 for the first storage tank 165. The PLC 300 also receives signals from the low level indicator 180 for first storage tank 165, the high level indicator 185 for second storage tank 170, the low level indicator 190 for second storage tank 170, and float switch 255 (or the low voltage pressure switch 247 in the alternative embodiment of FIG. 5B). Based on the states of the inputs it receives, the PLC 300 determines which devices in the water delivery system 61 to energize and which to de-energize.

Devices controlled by the PLC 300 include the booster pump 215, and a set of valves 305-330 (which in one embodiment are pneumatic valves). The valves 305-330 open and close the valves 140, 160, 200, and 210 (which in one embodiment are also pneumatic valves) of the water delivery system 61. Valves 305-330 are connected to compressor 340 which maintains pressure, such as 40 pounds per square inch ("psi"), in air line 345. The valve 305 is energized by a signal from the PLC 300 delivered from an output 350. When the PLC 300 generates an appropriate signal, the valve 305 opens. This causes air pressure in air line 355 to rise to 40 psi or some other pressure sufficient to activate the valves. The rise in pressure causes valve 140 to open. When valve 305 is de-energized, it closes. When the valve 305 closes, air pressure in air line 355 returns to zero, causing valve 140 to close. When valve 315 is energized, it opens. This causes air pressure in air line 365 to rise (e.g., to 40 psi). The rise in pressure causes valve 160 to open. When pneumatic valve 320 is de-energized it closes, and air pressure in air line 365 returns to zero. Valve 160 then closes. Valve 320 operates in a similar manner. When valve 320 is energized by the PLC 300, air pressure in air line 375 rises (e.g., to 40 psi). This causes valve 200 to open. When the valve 320 is de-energized, it closes. This causes air pressure in air line 375 to return to zero, causing air-actuated valve 200 to close. Valve 210 operates in a similar manner, opening and closing in accordance with commands received from the PLC and causing changes in air pressure that affect valve 210. Since operation of valves 200 and 210 are similar to the other valves discussed above, additional details are not provided.

The PLC 300 controls various components to create electrical isolation between water being delivered from the booster pump 215 and the well 100. The PLC 300 ensures that an electrical open exists in the water path through the first storage tank 165 by ensuring that valve 140 is closed (creating an air gap) or that valve 200 is closed (isolation created by non-conductive materials). The PLC 300 also ensures that an electrical open exists in the water path through the second storage tank 170 by ensuring that valve 160 is closed (creating an air gap) or that valve 210 is closed (isolation created by non-conductive materials).

Figure 7A:
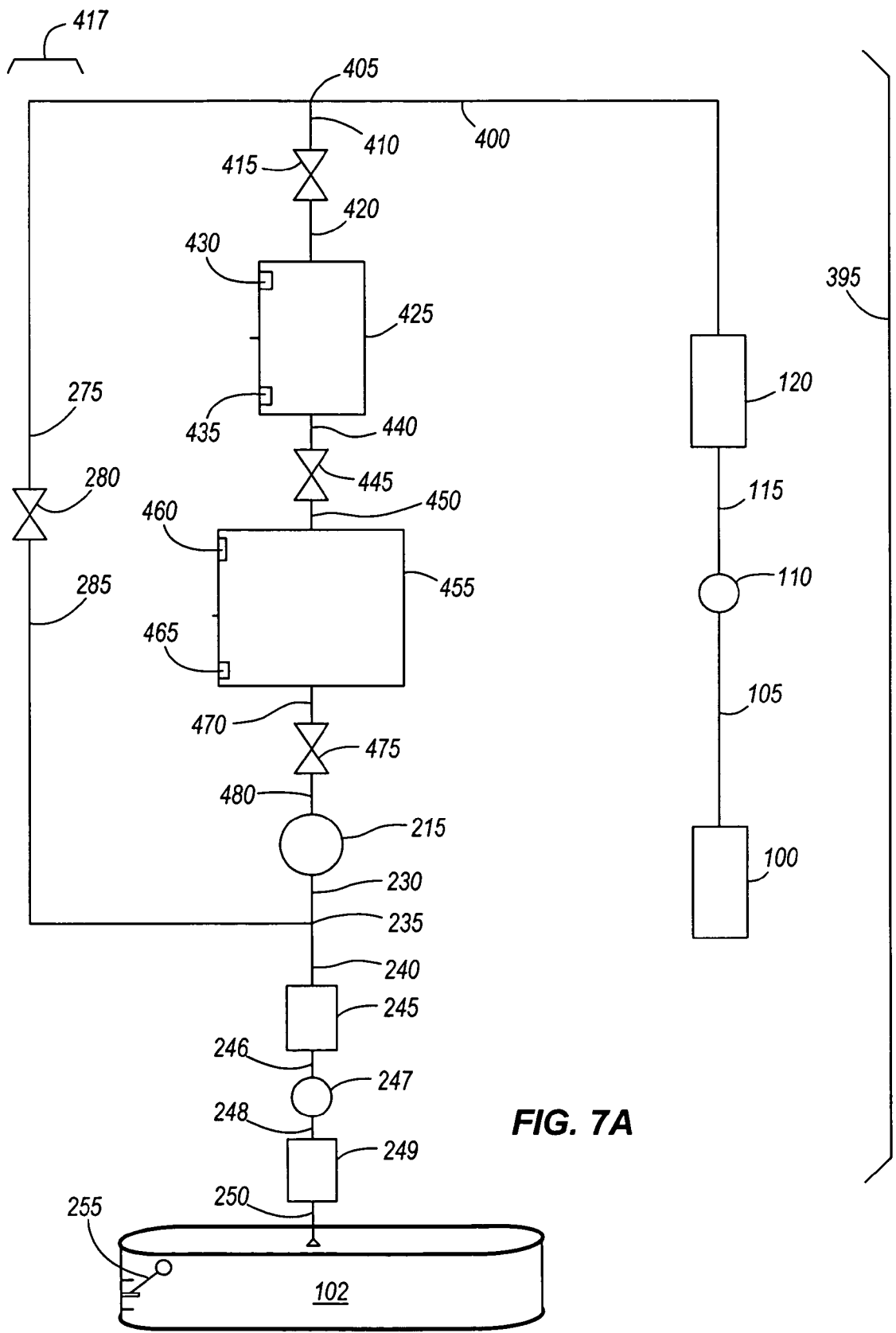
FIG. 7A is an exemplary illustration of a third embodiment of a water delivery system to reduce stray voltage.

FIG. 7A shows another embodiment of a water delivery system 395 that electrically isolates both the delivery containment devices and the water being supplied from one or more wells (referred to as well 100). The system includes well 100 and its associated devices, such as a pump and power supply for the pump (not shown). Well 100 delivers water through pipe 105 which is connected to a pressure switch 110. When pressure above a predetermined threshold is detected by pressure switch 110, the switch 110 opens an internal switch removing power to the pump of well 100.

Water exits pressure switch 110 through pipe 115 and enters filter 120. The filter removes certain contaminants such as sediment contained in the water. Water then flows through pipe 400 and into a Y-fitting or similar device 405 that divides the water into two paths. The first path flows into a pipe 410 which feeds a first valve 415. The second path flows into a manual bypass system 417.

When the first valve 415 is opened, water flows through pipe 420 into a first storage tank 425. A first sensor 430 detects when the water has reached a high level in the first storage tank 425. A second sensor 435 detects when water has reached a low level in the first storage tank 425. Water flows out of the first storage tank 425 via gravity through pipe 440 and into a second valve 445. When the second valve 445 is opened, water flows through pipe 450 into a second storage tank 455. A third sensor 460 detects when the water has reached a high level in the second storage tank 455. A fourth sensor 465 detects when water has reached a low level in the second storage tank 455. Water flows out of the second storage tank 455 via gravity through pipe 470 and into a third valve 475. In certain embodiments, the third valve 475 is air-actuated and constructed from non-conductive materials.

The booster pump 215 is fed from the third valve 475 via pipe 480. Water flows from the booster pump 215 though pipe 230. Pipe 230 connects to a Y-fitting or similar device 235 which feeds pipe 240. Pipe 240 is connected to pressure tank 245 which couples to a pipe 246. Pipe 246 feeds a low voltage pressure switch 247. When pressure above a predetermined threshold is detected by pressure switch 247, the pressure switch 247 opens an internal switch removing power to the booster pump 215. Water exits the pressure switch 247 through pipe 248 and enters filter 249. Filtered water leaves filter 249 via pipe 250 and flows into trough 102. As noted, the float switch 255 resides in trough 102 to indicate when the water level in trough 102 exceeds a predetermined depth. Like the system 61, pipes in the water delivery system 395 are made of non-conductive materials and certain valves are non-electrically-actuated (e.g., air-actuated).

Figure 7B:
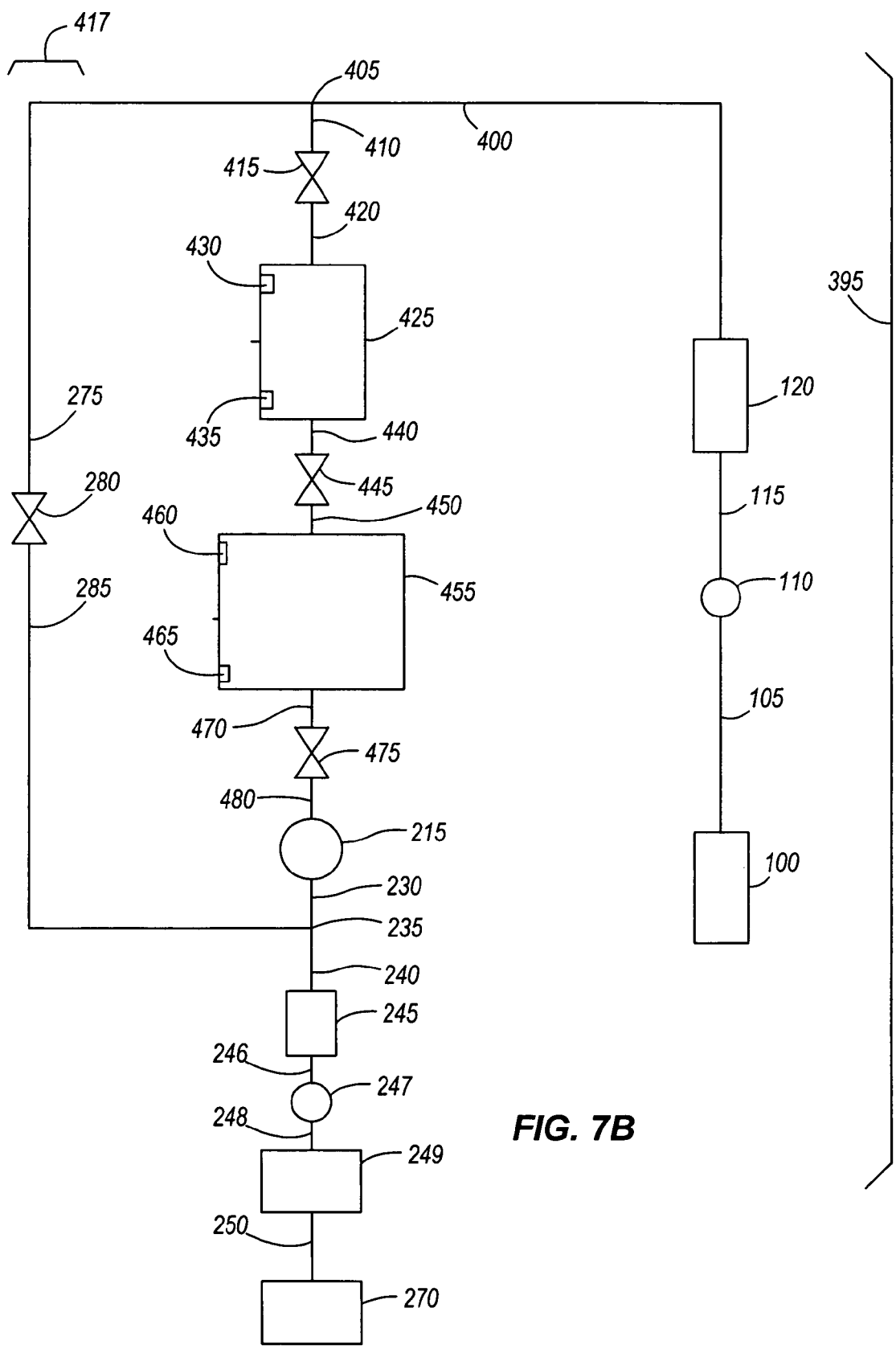
FIG. 7B is an exemplary illustration of a fourth embodiment of a water delivery system to reduce stray voltage.

An alternative embodiment of the water delivery system 395 is illustrated in FIG. 7B. The system is the same as that shown in FIG. 7A except that water flows from pipe 250 into a pressurized delivery system 270. The low-voltage pressure switch 247 detects when the water pressure in the pressurized delivery system 270 drops below a pre-determined threshold.

The manual bypass system 417 (FIGS. 7A and 7B) can be configured to supply water to the trough 102 or the pressurized delivery system 270 in the event the water system 395 is unable to do so. A pipe 275 receives water from Y-fitting 405 and is connected to a manually operated valve 280 which is constructed from non-conductive materials. Valve 280 is connected to pipe 285 which delivers water to Y-fitting 235 and the rest of the system. The use of non-conductive materials in valve 280 maintains the electrical isolation of the water system 61 when the valve 280 is closed.

A section of pipe 400 can be constructed of electrically conductive material (e.g., copper). In the presence of stray voltage on the well 100 system, measuring an electrical characteristic (e.g., voltage) between this conductive section of pipe 400 and ground reflects the level of stray voltage present. Additionally, a section of pipe 240 can be constructed of electrically conductive material (e.g., copper). If the system is operating correctly and electrical isolation between well 100 and the output of water system 395 is achieved, measuring an electrical characteristic (e.g., voltage) between this conductive section of pipe 240 and ground will indicate that stray voltage does not exist at this point in the water delivery system 395, even if such a characteristic exists between the conductive section of pipe 400 and ground.

Like certain other embodiments, certain valves used in the water distribution system 395 are non-electrically-actuated to further isolate the water delivery system 395 from the electrical distribution system. In addition, pipes used throughout the water delivery system 395 are made of non-conductive materials, such as plastics, ceramics, or other materials.

Operation of the System

In the embodiment shown if FIGS. 5A and 5B, electrical isolation of delivery system 61 is achieved, in part, by the use of non-conductive pipes. This creates an open circuit condition between well 100 and water trough 102 (or pressurized delivery system 270). In addition, utilization of air-actuated, relay-driven, low-voltage devices within the system reduces the possibility of introducing stray voltage from other sources. Electrical isolation of the water is achieved by preventing completion of an electrical circuit in water traveling from well 100 to water trough 102 (or pressurized delivery system 270). This is accomplished by ensuring that an open circuit condition (e.g., an air gap) exists in the water path between well 100 and the storage tank 165 or 170 that is supplying the water trough 102 (or pressurized delivery system 270). In addition, non-conductive air-actuated valves 200 and 210 act as electrical opens in the water circuit when they are closed, ensuring an electrical open exists in the circuit when the storage tanks are filling and an air gap does not otherwise exist in the water flowing through the system.

Figure 8:
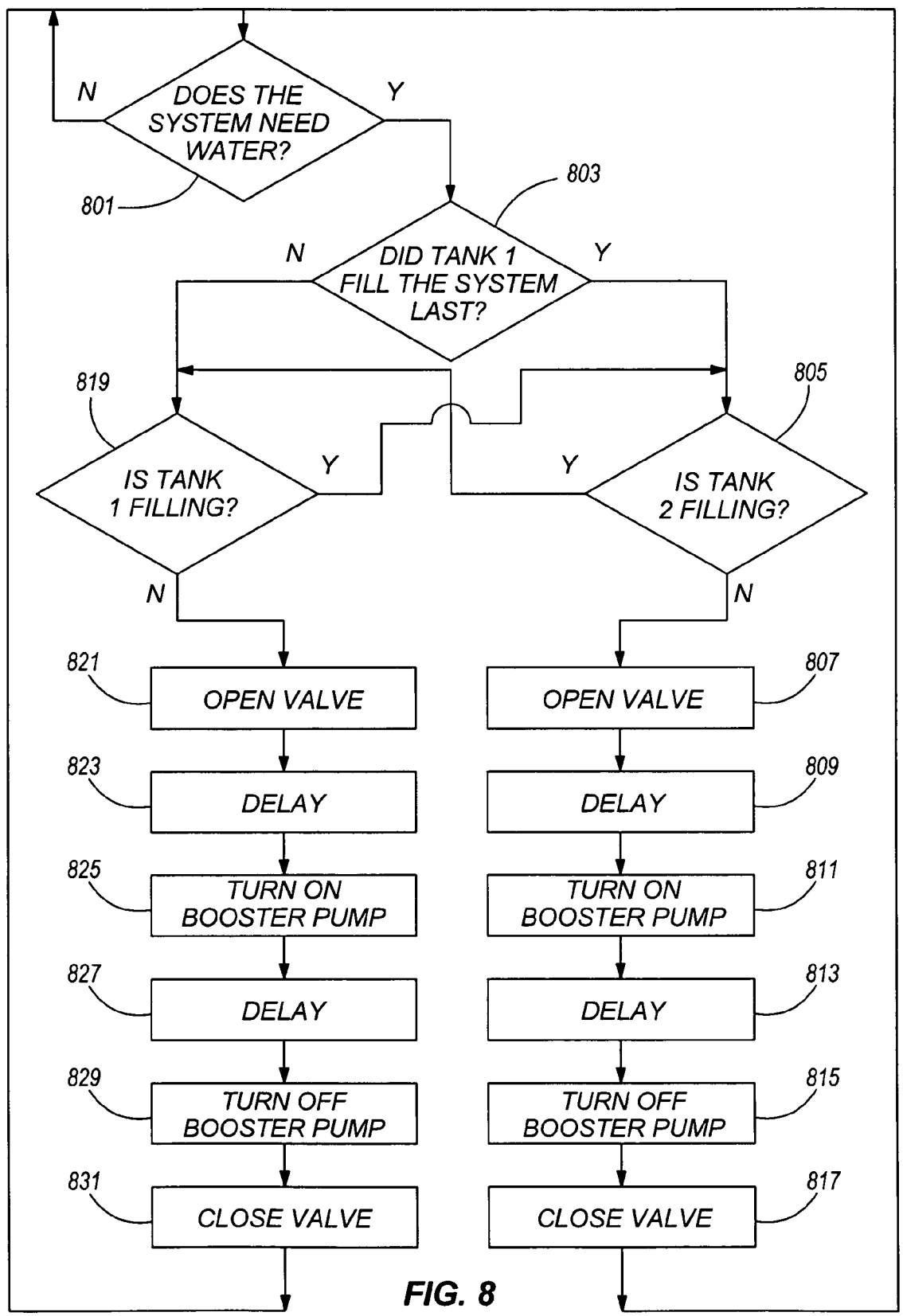
FIG. 8 is an illustration of a process to supply water using the water delivery system of FIGS. 5A and 5B.

FIG. 8 illustrates the process of sourcing water to trough 102 (or pressurized delivery system 270) in the water delivery system 61 shown in FIGS. 5A and 5B. The water level in trough 102 (or pressure in pressure delivery system 270) is checked at step 801 by PLC 300 by determining if float switch 255 (or pressure switch 247) is engaged. If float switch 255 (or pressure switch 247) is not engaged, the trough 102 (or pressurized delivery system 270) has sufficient water and the process loops back to step 801 to continue checking if the trough 102 (or pressurized delivery system 270) requires additional water. If, at step 801, float switch 255 (or pressure switch 247) is engaged, which indicates that the water level in trough 102 (or pressure in the pressurized delivery system 270) is low, the process of providing water to trough 102 (or pressurized delivery system 270) continues.

At step 803 a determination is made if the first storage tank 165 filled trough 102 (or pressurized delivery system 270) the previous time water was required. If the first storage tank 165 was used to fill trough 102 (or pressurized delivery system 270) the previous time water was required, an attempt to utilize the second storage tank 170 is made. At step 805 second storage tank 170 is checked to determine if it is being filled from well 100. If the second storage tank 170 is not filled being by well 100, the second storage tank 170 is chosen to fill trough 102 (or pressurized delivery system 270). Non-conductive air-actuated valve 210 is opened at step 807. To ensure that an open exists in the water path from well 100 through second storage tank 170, it is necessary to ensure that valve 160 is not open and residual water flow has ceased. A delay, at step 809, accomplishes this. Following the delay at step 809, booster pump 215 is energized at step 811. A pre-determined delay to fill trough 102 (or pressurized delivery system 270) is executed at step 813. Once trough 102 (or pressurized delivery system 270) has been filled, booster pump 215 is de-energized at step 815 and valve 210 is closed. Processing continues at step 801 to wait for water in trough 102 (or pressure in pressurized delivery system 270) to reach a low level.

If it is determined that the second storage tank 170 was used to fill trough 102 (or pressurized delivery system 270) the previous time water was required or if the second storage tank 170 is being filled from well 100, it is determined whether the first storage tank 165 is being filled from well 100 at step 819. If the first storage tank 165 is being filled from well 100, processing continues at step 805. If both the first storage tank 165 and the second storage tank 170 are filling from well 100, the first one to finish filling is utilized to fill trough 102 (or pressurized delivery system 270).

If it is determined that the first storage tank 165 is not filling (step 819), the first storage tank 165 is used to fill trough 102 (or pressurized delivery system 270). Valve 200 is opened at step 821. To ensure that an open circuit condition exists in the water path from well 100 through the first storage tank 165, air-actuated valve 140 should be closed and any residual water flow should end. A delay (step 823) is used to ensure that sufficient time has passed to allow valve 140 to close and water flow to stop. Following the delay, booster pump 215 is energized at step 825. A predetermined delay to fill trough 102 (or pressurized delivery system 270) is executed at step 827. Once trough 102 (or pressurized delivery system 270) has been filled, booster pump 215 is de-energized at step 829 and valve 200 is closed. Processing continues at step 801 waiting for water in trough 102 (or pressurized delivery system 270) to reach a low level.

Figure 9:
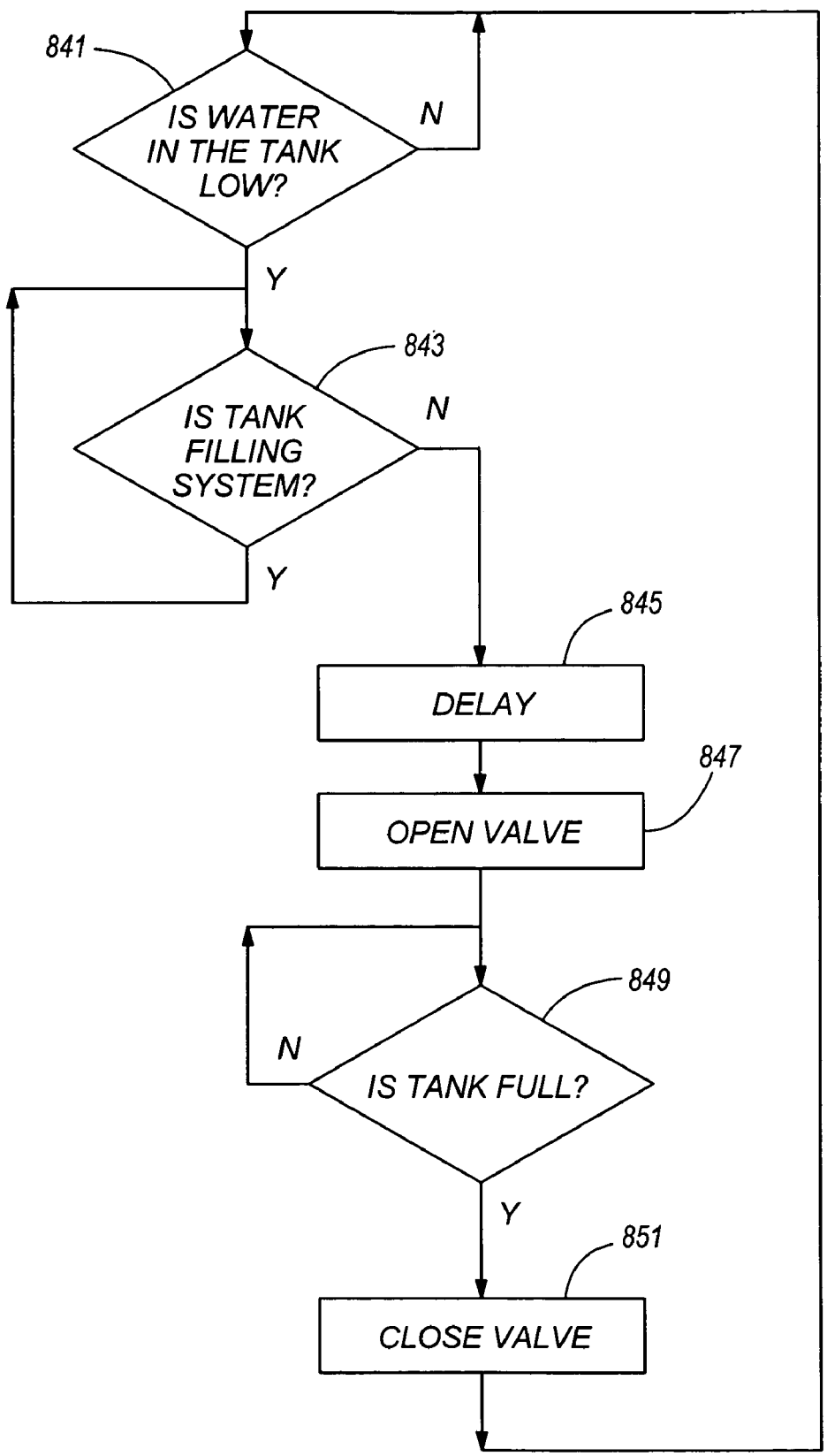
FIG. 9 is an illustration of a process for filling the storage tanks of FIGS. 5A and 5B.

FIG. 9 illustrates the process for filling storage tanks 165 and 170 when their water level reaches a low point. Sensor 180 is checked at step 841 to determine if the water level in the first storage tank 165 has reached a low level. If the water level in the first storage tank 165 is not low, the process loops back to step 841 to continue monitoring the water level.

If the sensor 180 indicates that the water level has reached a low level (step 841), it is determined at step 843 whether first storage tank 165 is filling trough 102 (or pressurized delivery system 270). If first storage tank 165 is filling trough 102 (or pressurized delivery system 270), it cannot be filled from well 100 without closing the electrical open in the water loop. Therefore, the process loops at step 843 until trough 102 (or pressurized delivery system 270) has finished filling.

Once the first storage tank 165 is finished filling trough 102 (or pressurized delivery system 270), processing continues at step 845 with a delay. This delay ensures an open circuit condition exists in the water loop by providing sufficient time for residual water flow to end. Once the delay is complete, air-actuated valve 140 is opened at step 847. Water flows into first storage tank 165 from well 100. Sensor 175 is monitored at step 849. Once water reaches a level sufficient for the sensor 175 to detect (step 849), valve 140 is closed (step 851). Processing continues at step 841 by monitoring sensor 180.

For the second storage tank 170, sensor 190 is checked at step 841 to determine if the water level in the second storage tank 170 has reached a low level. If the water level in the second storage tank 170 is not low, the process loops back to step 841 to continue monitoring the water level.

If the sensor 190 indicates that the water level has reached a low level (step 841), it is determined at step 843 whether second storage tank 170 is filling trough 102 (or pressurized delivery system 270). To maintain electrical isolation, storage tank 170 is not filled from the well 100 while the tank 170 is filling through 102 (or pressurized delivery system 270). Therefore, the process loops at step 843 until the trough 102 (or pressurized delivery system 270) has finished filling.

Once the second storage tank 170 is finished filling trough 102 (or pressurized delivery system 270), processing continues at step 845 with a delay. This delay ensures an electrical open exists in the water loop by allowing any residual water flow to end. Once the delay is complete, air-actuated valve 160 is opened at step 847. Water flows into second storage tank 170 from well 100. Sensor 185 is monitored at step 849. Once water reaches a level sufficient for the sensor 185 to detect (step 849), valve 160 is closed (step 851). Processing continues at step 841 by monitoring the sensor 190.

Figure 10:
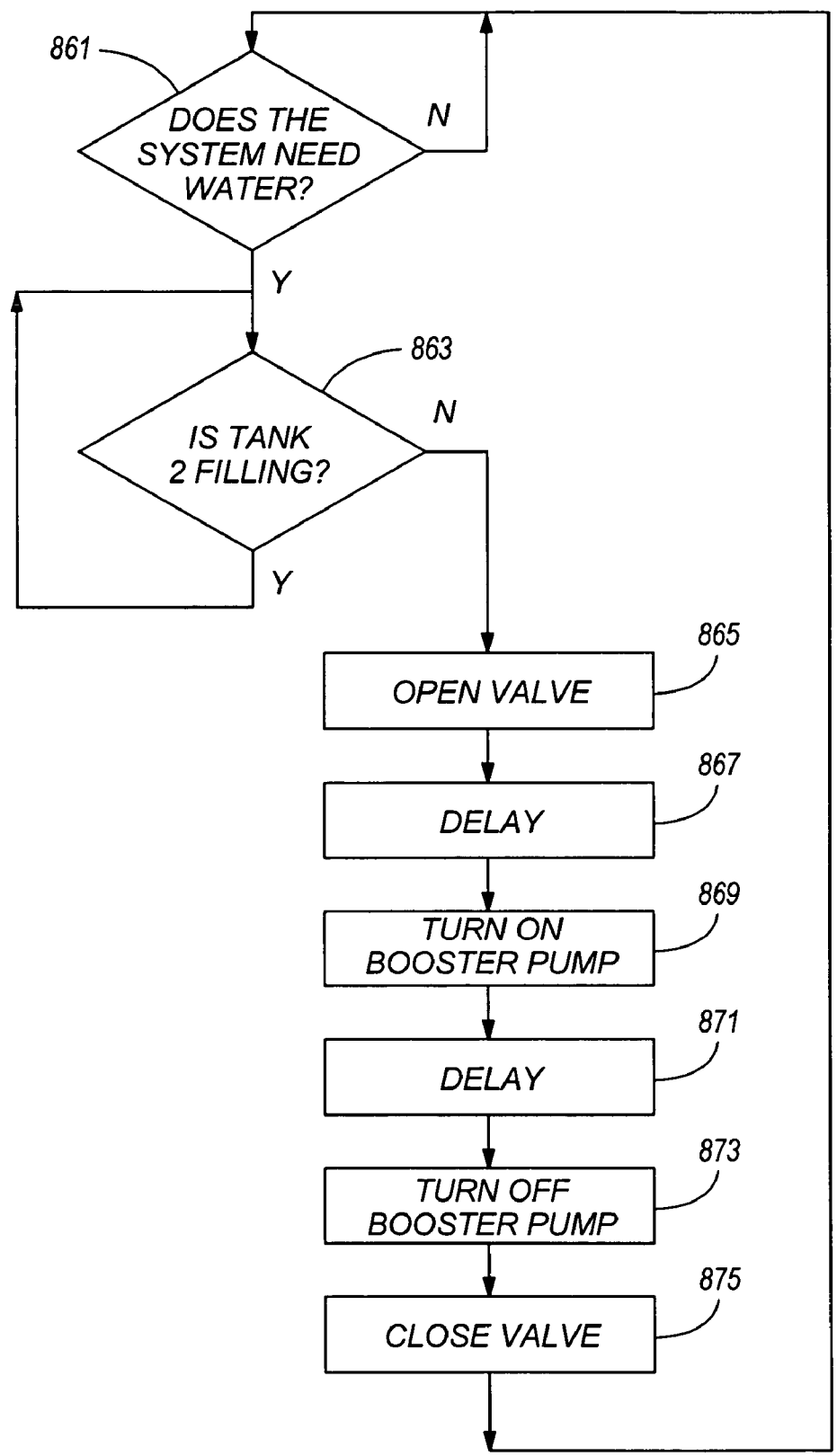
FIG. 10 is an illustration of a process to supply water using the water delivery system of FIGS. 7A and 7B.

FIG. 10 illustrates an embodiment of a process of sourcing water to trough 102 (or pressurized delivery system 270) in the water delivery system 395 shown in FIGS. 7A and 7B. The water level in trough 102 (or pressure in pressurized delivery system 270) is checked at step 861 by PLC 300 determining if float switch 255 (or pressure switch 247) is engaged. In alternative embodiments, the float switch 255 may be non-electrical. If float switch 255 (or pressure switch 247) is not engaged, trough 102 (or pressurized delivery system 270) has sufficient water and the process loops back to step 861 to continue checking if trough 102 (or pressurized delivery system 270) requires additional water. If, at step 861, the float switch 255 (or pressure switch 247) is engaged, which indicates that the water level in trough 102 (or pressure in pressurized delivery system 270) is low, the process of providing water to trough 102 (or pressurized delivery system 270) continues at step 863.

Second storage tank 455 is checked to determine if it is being filled from the first storage tank 425. If the first storage tank 425 is not filling second storage tank 455, the second storage tank 455 fills trough 102 (or pressurized delivery system 270). Valve 475 is opened at step 865. To ensure that an open circuit condition exists in the water path from well 100 through second storage tank 455, it is necessary to ensure that valve 445 is not open and residual water flow has ceased. A delay, at step 867, accomplishes this. Following the delay at step 867, booster pump 215 is energized at step 869. A pre-determined delay to fill trough 102 (or pressurized delivery system 270) is executed at step 871. Once the trough 102 (or pressurized delivery system 270) has been filled, booster pump 215 is de-energized at step 873 and valve 475 is closed.

Processing continues at step 861 to wait for water in trough 102 (or pressure in pressurized delivery system 270) to reach a low level.

Figure 11:
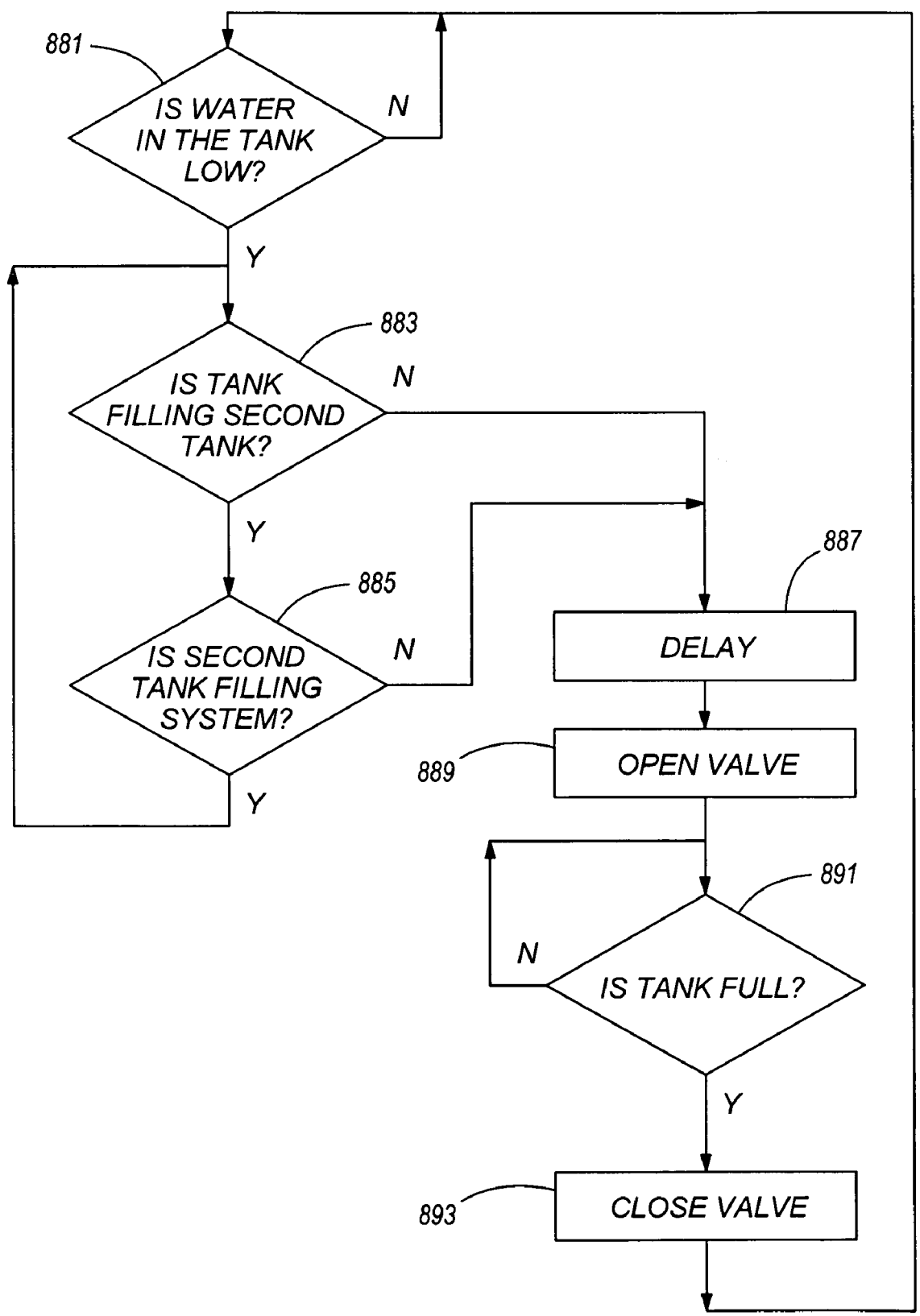
FIG. 11 is an illustration of a process for filling a storage tank of FIGS. 7A and 7B.

FIG. 11 illustrates the process for filling first storage tank 425 in the water delivery system 395 shown in FIGS. 7A and 7B. Sensor 435 is checked at step 881 to determine if the water level in first storage tank 425 has reached a low level. If the water level in first storage tank 425 is not low, the process loops back to step 881 to continue monitoring the water level.

If the sensor 435 indicates that the water level has reached a low level, it is determined at step 883 whether first storage tank 425 is filling the second storage tank 455. If first storage tank 425 is filling the second storage tank 455, it is determined at step 885 whether second storage tank 455 is filling trough 102 (or pressurized delivery system 270). If the first storage tank 425 is filling the second storage tank 455 and the second storage tank 455 is filling trough 102 (or pressurized delivery system 270), the first storage tank 425 cannot be filled from well 100 without closing the electrical open in the water loop. Therefore, the process loops back to step 883 until either the second storage tank 455 or the trough 102 (or pressurized delivery system 270) has finished filling.

Once the second storage tank 455 is not filling or trough 102 (or pressurized delivery system 270) is filled, processing continues at step 887 with a delay. This delay ensures an electrical open exists in the water loop by allowing any residual water flow to end. Once the delay is complete, air-actuated valve 415 is opened at step 889. Water then flows into first storage tank 425 from well 100. Sensor 430 is monitored at step 891. Once water reaches the high level, sensor 430 detects the water at step 891 and valve 415 is closed at step 893. Processing continues at step 881 by monitoring the sensor 435.

FIG. 9 illustrates the process for filling second storage tank 455 in the water delivery system 395 shown in FIGS. 7A and 7B. Sensor 465 is checked at step 841 to determine if the water level in second storage tank 455 has reached a low level. If the water level in second storage tank 455 is not low, the process loops back to step 841 to continue monitoring the water level.

If the sensor 465 indicates that the water level has reached a low level (step 841), it is determined at step 843 whether the second storage tank 455 is filling trough 102 (or pressurized delivery system 270). If the second storage tank 455 is filling trough 102 (or pressurized delivery system 270) it cannot be filled from well 100 without the possibility of closing the electrical open in the water loop. Therefore, the process loops at step 843 until the trough 102 (or pressurized delivery system 270) has finished filling.

Once trough 102 (or pressurized delivery system 270) is filled from the second storage tank 455, processing continues at step 845 with a delay. This delay ensures an electrical open exists in the water loop by allowing any residual water flow to end. Once the delay is complete, valve 445 is opened at step 847. Water then flows into second storage tank 455 from the first storage tank 425 via gravity. Sensor 460 is monitored at step 849. Once water reaches a high level, sensor 460 detects the water at step 849 and valve 445 is closed at step 851. Processing continues at step 841, monitoring the sensor 465.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. As should also be apparent to one of ordinary skill in the art, some systems and components shown in the figures are models of actual systems and components. Some control components described are capable of being implemented in software executed by a microprocessor or a similar device or of being implemented in hardware using a variety of components including, for example, timers and relays. In addition, terms like "processor" or "controller" may include or refer to both hardware and/or software.

Various features and advantages of the invention are set forth in the following claims.

What is claimed is:

1. An electrically-isolated, liquid distribution system, the system comprising:
   a splitter having a first branch and a second branch;
   a first valve connected to the first branch;
   a second valve connected to the second branch;
   a first tank fed by the first valve;
   a second tank fed by the second valve;
   a third non-electrically-actuated valve, constructed of non-conductive materials, connected to the first tank;
   a fourth non-electrically-actuated valve, constructed of non-conductive materials, connected to the second tank;
   a controller configured to prevent the first valve and the third valve to be open simultaneously, and to prevent the second valve and the fourth valve to be open simultaneously; and
   a connection to a liquid delivery device.

2. The system of claim 1 further comprising a pressure switch configured to shut down a well pump when a pressure exceeds a threshold.

3. The system of claim 1 further comprising one or more filters to remove contaminants from a liquid.

4. The system of claim 1 further comprising a sensor to detect a level in a liquid delivery device.

5. The system of claim 4 wherein the controller is configured to cause an action that fills the liquid delivery device when the sensor detects a low level in the liquid delivery device.

6. The system of claim 1 further comprising a sensor to detect a pressure in a liquid delivery device.

7. The system of claim 6 wherein the controller is configured to cause an action that fills the liquid delivery device when the sensor detects a low pressure in the liquid delivery device.

8. The system of claim 1 further comprising a sensor to detect a low level in the first tank.

9. The system of claim 8 wherein the controller is configured to cause an action that fills the first tank when the sensor detects a low level in the first tank.

10. The system of claim 1 further comprising a sensor to detect a low level in the second tank.

11. The system of claim 10 wherein the controller is configured to cause an action that fills the second tank when the sensor detects a low level in the second tank.

12. The system of claim 1 further comprising a sensor to detect a high level in the first tank.

13. The system of claim 12 wherein the controller is configured to cause an action that stops filling the first tank when the sensor detects a high level in the first tank.

14. The system of claim 1 further comprising a sensor to detect a high level in the second tank.

15. The system of claim 14 wherein the controller is configured to cause an action that stops filling the second tank when the sensor detects a high level in the second tank.

16. The system of claim 1 further comprising:
    a second splitter connected to the second branch and having a third branch and a fourth branch;
    the third branch connected to the second valve;
    the fourth branch connected to a fifth valve, constructed of non-conductive materials; and
    the fifth valve connected to the liquid delivery device.

17. An electrically isolating liquid distribution system, the system comprising:
    a first valve;
    a first tank fed by the first valve;
    a second valve connected to the first tank;
    a second tank fed by the second valve;
    a third valve constructed of non-conductive materials and non-electrically-actuated connected to the second tank; and
    a controller configured to prevent the second valve and the third valve to be open simultaneously; and
    a connection to a liquid delivery device.

18. The system of claim 17 further comprising a pressure switch configured to shut down a well pump when a pressure exceeds a threshold.

19. The system of claim 17 further comprising one or more filters to remove contaminants from a liquid.

20. The system of claim 17 further comprising a sensor to detect a level in a delivery device.

21. The system of claim 20 wherein the controller is configured to cause an action that fills the delivery device when the sensor detects a low level in the delivery device.

22. The system of claim 17 further comprising a sensor to detect a pressure in a delivery device.

23. The system of claim 22 wherein the controller is configured to cause an action that fills the delivery device when the sensor detects a low pressure in the delivery device.

24. The system of claim 17 further comprising a sensor to detect a low level in the first tank.

25. The system of claim 24 wherein the controller is configured to cause an action that fills the first tank when the sensor detects a low level in the first tank.

26. The system of claim 17 further comprising a sensor to detect a low level in the second tank.

27. The system of claim 26 wherein the controller is configured to cause an action that fills the second tank when the sensor detects a low level in the second tank.

28. The method of claim 27 further comprising stopping filling of the first storage tank when the liquid reaches a high level.

29. The method of claim 27 further comprising stopping filling of the second storage tank when the liquid reaches a high level.

30. The system of claim 17 further comprising a sensor to detect a high level in the first tank.

31. The system of claim 30 wherein the controller is configured to cause an action that stops filling the first tank when the sensor detects a high level in the first tank.

32. The system of claim 17 further comprising a sensor to detect a high level in the second tank.

33. The system of claim 32 wherein the controller is configured to cause an action that stops filling the second tank when the sensor detects a high level in the second tank.

34. The method of claim 32 further comprising stopping filling of the first storage tank when the liquid reaches a high level.

35. The method of claim 32 further comprising stopping filling of the second storage tank when the liquid reaches a high level.

36. The system of claim 17 further comprising:
    a splitter having a first branch and a second branch;
    the first branch connected to the first valve;

the second branch connected to a fifth valve, constructed of non-conductive materials; and the fifth valve connected to the liquid delivery device.

37. A method for reducing stray voltage in a liquid delivery system, the method comprising:
- providing a first storage tank;
- providing a second storage tank;
- monitoring the first storage tank;
- monitoring the second storage tank;
- filling the first storage tank when a liquid reaches a low level;
- filling the second storage tank when a liquid reaches a low level;
- delivering the liquid from the first or second storage tank to a liquid delivery device;
- controlling filling of the first storage tank and delivery from the first storage tank such that only one of the processes can occur at a single time such that an air gap exists between a liquid source and the liquid in the first storage tank when the first storage tank is delivering the liquid to the liquid delivery device; and
- controlling filling of the second storage tank and delivery from the second storage tank such that only one of the processes can occur at a single time such that an air gap exists between a liquid source and the liquid in the second storage tank when the second storage tank is delivering the liquid to the liquid delivery device.

38. A method for reducing stray voltage in a liquid delivery system, the method comprising:
- providing a first storage tank;
- providing a second storage tank;
- monitoring the first storage tank;
- monitoring the second storage tank;
- filling the first storage tank when a liquid in the first storage tank reaches a low level;
- filling the second storage tank from the first storage tank when a liquid in the second storage tank reaches a low level;
- delivering the liquid from the second storage tank to a liquid delivery device; and
- controlling filling of the first storage tank and the second storage tank, such that the first and second tank are not filling at a single time.

39. An electrically isolating liquid distribution system, the system comprising:
- a first valve;
- a tank fed by the first valve;
- a second valve constructed of non-conductive materials and non-electrically-actuated connected to the first tank;
- a controller configured to prevent the first valve and the second valve from being open simultaneously; and
- a connection to a liquid delivery device.

40. An electrically-isolated, liquid distribution system, the system comprising:
- a liquid supply;
- a first valve connected to the liquid supply;
- a tank supplied by the first valve;
- a second valve connected to the tank, the second valve non-electrically-actuated and constructed of non-conductive materials;
- a liquid delivery system supplied by the second valve; and
- a controller configured to ensure one of the first valve and the second valve are closed at any point in time such that an air gap exists between the liquid supply and a liquid in the tank when the tank is delivering the liquid to the liquid delivery system.

41. An electrically isolating liquid distribution system, the system comprising:
- a first valve;
- a first tank fed by the first valve;
- a second valve connected to the first tank;
- a second tank fed by the second valve; and
- a controller configured to ensure one of the first valve and the second valve are closed at any point in time; and
- a liquid delivery device connected to the second tank.

* * * * *